US012728528B2

(12) United States Patent
Kirihara

(10) Patent No.: US 12,728,528 B2
(45) Date of Patent: Sep. 8, 2026

(54) METHOD FOR CONTROLLING AN OUTPUT SHAFT IN A DRIVE UNIT

(71) Applicant: Schaeffler Technologies AG & Co. KG, Herzogenaurach (DE)

(72) Inventor: Daisuke Kirihara, Yokohama (JP)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 247 days.

(21) Appl. No.: 18/721,083

(22) PCT Filed: Oct. 10, 2022

(86) PCT No.: PCT/DE2022/100746
§ 371 (c)(1), (2) Date: Jun. 17, 2024

(87) PCT Pub. No.: WO2023/109997
PCT Pub. Date: Jun. 22, 2023

(65) Prior Publication Data

US 2025/0058464 A1 Feb. 20, 2025

(30) Foreign Application Priority Data

Dec. 17, 2021 (DE) ........................ 102021133572.8

(51) Int. Cl.
*H02K 7/116* (2006.01)
*B25J 9/10* (2006.01)
(Continued)

(52) U.S. Cl.
CPC ........... *B25J 9/1641* (2013.01); *B25J 9/1025* (2013.01); *B25J 9/126* (2013.01)

(58) Field of Classification Search
CPC ........ H02K 11/21; H02K 11/24; H02K 21/24; G05B 2219/37604; G05B 2219/39186; G05B 2219/41246; G05B 2219/41261
See application file for complete search history.

(56) References Cited

U.S. PATENT DOCUMENTS 9,293,962 B2 3/2016 Park et al.
2013/0257230 A1 10/2013 Park et al.
2020/0139544 A1* 5/2020 Negishi .................. H02P 23/00

FOREIGN PATENT DOCUMENTS

CN 113326627 A 8/2021
DE 102014102905 A1 9/2014
(Continued)

OTHER PUBLICATIONS

European Patent Office, International Search Report received in International Application No. PCT/DE2022/100746, Jan. 18, 2023, 24 pages (including translation).

*Primary Examiner* — Muhammad S Islam
(74) *Attorney, Agent, or Firm* — Suiter Swantz IP

(57) ABSTRACT

The invention relates to a method (200) for controlling an angular position of an output shaft in a drive unit (100), comprising the steps of:

- detecting a change in direction of a drive apparatus (5),
- detecting the torque transmitted by a flexible ring (6.3) of a strain wave gear immediately upon detection of the change in direction by means of a second sensor (12),
- determining a drive period of the drive apparatus (5) until the expected attainment of a transmission torsion (14.1, 14.2) of the flexible ring (6.3) on the basis of the first torque,
- driving a drive shaft (4) by means of the drive apparatus (5) over the drive period,
- detecting a change in angular position of the output shaft immediately after the end of the drive period by means of a first sensor (11.1), and
- controlling the drive apparatus using the first sensor (11.1) following the drive period when a change in angular position is detected.

20 Claims, 3 Drawing Sheets

(51) Int. Cl.

*B25J 9/12* (2006.01)
*B25J 9/16* (2006.01)

(56) References Cited

FOREIGN PATENT DOCUMENTS

| | | | |
|---|---|---|---|
| DE | 102020129642 | A1 | 5/2022 |
| JP | 2003061377 | A | 2/2003 |
| JP | 2006050710 | A | 2/2006 |
| JP | 2013049514 | A | 3/2013 |
| JP | 2014104528 | A | 6/2014 |
| JP | 2015149060 | A | 8/2015 |
| JP | 2016118435 | A | 6/2016 |
| JP | 5955447 | B1 | 7/2016 |
| JP | 2017116384 | A | 6/2017 |
| JP | 2017140685 | A | 8/2017 |
| JP | 6334317 | B2 | 5/2018 |
| JP | 2019103898 | A | 6/2019 |
| JP | 2020049568 | A | 4/2020 |
| JP | 2020116693 | A | 8/2020 |
| JP | 2020196091 | A | 12/2020 |
| KR | 102061693 | B1 | 1/2020 |
| WO | 2020053195 | A1 | 3/2020 |

* cited by examiner

METHOD FOR CONTROLLING AN OUTPUT SHAFT IN A DRIVE UNIT

CROSS-REFERENCE TO RELATED APPLICATION

The present application is the U.S. National Phase of PCT Patent Application Number PCT/DE2022/100746, filed on Oct. 10, 2022, which claims priority to German Patent Application Number 10 2021 133 572.8, filed Dec. 17, 2021, the entire disclosures of which are incorporated by reference herein.

TECHNICAL FIELD

The disclosure relates to a method for controlling an angular position of an output shaft in a drive unit having a drive shaft, a drive apparatus for driving the drive shaft, and a strain wave gear for transmission from the drive shaft to the output shaft, wherein the strain wave gear has a wave generator operatively connected to the drive shaft, a flexible ring, and a toothed ring connected to the output shaft, comprising a first sensor for detecting the angular position of the output shaft and a second sensor for detecting a torque transmitted by the flexible ring. The disclosure also relates to such a drive unit, wherein the drive unit is designed to carry out a method, and to a robot having such a drive unit.

BACKGROUND

Drive units are known from the prior art and are used in particular in robotics, for example to move robotic arms used in industry, in laboratory technology, or in medical technology. For this purpose, the drive units are equipped with strain wave gears to enable a very high transmission ratio between the drive apparatus and the part of the robot to be moved for precise movement. Strain wave gears have a wave generator or wave maker, which has a non-round, in particular oval, cross-section and runs in a flexible ring, also called a flex spline, wherein the flexible ring is deformed all the way around. The flexible ring has an external toothing which engages in an internal toothing of a toothed ring designed as an outer ring only at the two outer points of its deformation. Due to the circumferential deformation, the engagement points also rotate, wherein the number of teeth of the flexible ring and that of the toothed ring differ, so that the toothed ring is set in a rotary motion that is significantly slower than the rotary motion of the wave generator.

In this regard, the drive apparatus is controlled by means of a control method in order to move the output shaft as precisely as possible to target angular positions. Also in this regard, sensors are usually arranged on the drive shaft and on the output shaft, which serve as actual value transmitters for controlling the drive apparatus, wherein the sensor on the drive shaft is used for coarse positioning and the sensor on the output shaft is used for fine positioning. The provision of two sensors is particularly necessary because the flexible ring is elongated in the form of torsion when the drive shaft and thus also the output shaft are driven, in particular during acceleration of the drive unit, wherein the elongation is superimposed on the correlation between the angular position of the drive shaft and the angular position of the output shaft. A sufficiently precise control of the output shaft with just one of the sensors is therefore not possible. Electric motors, in particular axial flux motors, are usually used as the drive apparatus and incremental rotary encoders are used as sensors. A corresponding drive unit is known, for example, from KR 102061693 B1.

Furthermore, a drive unit having a sensor for detecting the elongation of the output shaft is known from JP 6334317 B. A servomotor with controllable torque is also known from JP 2020 196091 A. A device for detecting faults in a sensor is known from JP 5955447 B. Finally, a device for controlling a motor which can automatically set control parameters is known from JP 2003 061377 A.

The disadvantage is that drive units with sensors on the output shaft and on the drive shaft are complex, expensive and require a lot of installation space.

SUMMARY

One object of the disclosure is to propose a drive unit in which the disadvantages described do not exist. The object is achieved by the method according to claim 1. Furthermore, the object is achieved by the subject matter of claim 6 and the subject matter of claim 10. Preferred embodiments can be found in the dependent claims.

According to one aspect of the disclosure, a method for controlling an angular position of an output shaft in a drive unit described at the outset has the following steps:

- detecting a change in direction of the drive apparatus with respect to a prior rotation,
- detecting the torque transmitted by the flexible ring immediately upon detection of the change in direction by means of the second sensor,
- determining a drive period of the drive apparatus until the expected attainment of a transmission torsion of the flexible ring on the basis of the first torque,
- driving the drive shaft by means of the drive apparatus over the drive period,
- detecting a change in angular position of the output shaft immediately after the end of the drive period by means of the first sensor, and
- controlling the drive apparatus using the first sensor following the drive period when a change in angular position is detected.

A change in direction means that the drive apparatus drives or has driven the drive shaft in a first direction before the change in direction and drives it in a second direction opposite to the first direction after the change in direction. A change in direction is therefore accompanied by braking and subsequent acceleration of the drive unit. In this regard, the direction is always to be understood as a direction of rotation. When the drive apparatus is rotated in one direction, the drive shaft, the strain wave gear or all components of the strain wave gear and the output shaft are also rotated in this direction, at least after an initial phase. In this regard, a prior rotation of the drive apparatus can exist up to immediately before the change in direction or precede the change in direction in time with respect to a driving of the output shaft in the first direction.

When rotating in the first direction, torsion exists in the flexible ring in the first direction. When rotating in the second direction after the change in direction, the torsion of the flexible ring in the first direction is reduced and torsion is built up in the second direction. If there is a time interval between the rotation in the first direction and the rotation in the second direction during which no torque is applied to the flexible ring, the torsion is reduced to a residual value and is built up in the second direction starting from the residual value during the rotation in the second direction. During the reduction and/or build-up of the torsion, no or only very little drive power is yet transferred to the output shaft.

Instead, the drive torque is converted into strain energy in order to build up the described torsion. As soon as a transmission torsion is fully formed on the flexible ring, the rotary motion of the output shaft corresponds with the drive apparatus in a linear correlation. In this regard, transmission torsion is understood to be a torsion of the flexible ring in which the input torque on the flexible ring corresponds to the output torque, i.e., no further torsion takes place.

The correlation between the torsion applied to the flexible ring and the torque transmitted by the flexible ring represents a hysteresis at the transition between a rotation in the first direction and a rotation in the second direction. This means that the correlation between the two variables depends on the direction in which the change between two rotations takes place. Starting from a rotation in the first direction to a rotation in the second direction, the course follows a first path and, starting from a rotation in the second direction to a rotation in the first direction, a second path. When a change in direction occurs, the correlation changes from the first to the second path. If the paths coincide when the transmission torsion is formed, the torsion can be determined at any time during a change in direction in spite of the path change. If the path is changed apart from the transmission torsion, a change is made between the paths on an undefined intermediate path.

The disclosure has now recognized that, by considering the torque transmitted by the flexible ring immediately prior to a change in direction, it is possible to predict, in particular in view of the known hysteresis behavior of the torsion of the flexible ring, how far the drive apparatus must be rotated in the second direction until the transmission torsion in the second direction is attained. A corresponding distance over which the drive apparatus must be driven or a corresponding time, with the drive power known, until the transmission torsion is attained, is referred to here as the drive period. With this information, it is possible to know the correlation between the angular position of the drive apparatus and the angular position of the output shaft without there being a measurable correlation between the drive apparatus and the first sensor on the output shaft. More precisely, there exists a control variable for the drive apparatus until the transmission torsion is attained, namely the drive period. It is therefore possible with the first and second sensors to establish a correlation between the drive apparatus and the angular position of the output shaft at any time, namely until the transmission torsion is attained by means of the aforementioned prediction of the drive period and thereafter via the existing linear correlation. This means that the first and second sensors are sufficient to control the drive apparatus. There is therefore no need for an additional sensor to detect the angular position of the drive shaft. The control of the drive unit is thus simplified and the drive unit can be built more compactly and is cheaper to manufacture.

In particular, the disclosure utilizes the knowledge that the correlation between the torsion of the flexible ring and the torque transmitted by the flexible ring during a change in direction lies along a known path of a hysteresis curve, at least after a path change. If the change in direction immediately follows a rotation in the first direction, in particular with the transmission torsion formed, the correlation lies on the second path of the hysteresis curve at the time of detection and the torsion present can thus be determined by detecting the torque. It is known in this regard that the correlation after the change in direction will lie on the first path on the hysteresis curve when the transmission torsion is attained in the second direction, wherein the transmission torsion and the torque to be transmitted are known. The angular section between the two torsion states, over which the drive apparatus must be adjusted in order to twist the flexible ring until the transmission torsion is attained, is therefore known.

If the torsion in the flexible ring has already been reduced at the time of the change in direction, for example if a period of time without any driving has preceded this, a state may exist in which the torsion at the time of the change in direction does not lie on one of the known paths of the hysteresis curve, but between these known paths. In this respect, the exact correlation between the torsion of the flexible ring and the torque transmitted by the flexible ring in this state is not precisely known. The disclosure can still achieve sufficiently accurate control of the drive apparatus from this state using the information from the first and second sensors by assuming a hysteresis error for the correlation and using this hysteresis error to estimate the torsion at the time of the change in direction. It is known in this regard that the correlation lies between the first and second path of the hysteresis curve, so that the hysteresis error is determined or can be determined by this limitation. The transmission torsion, up to which the flexible ring must be twisted, remains known.

According to one aspect of the disclosure, the drive apparatus is driven starting from the change in direction over the drive period, wherein the transmission torsion is then attained. As soon as the transmission torsion is attained, the drive apparatus can be controlled directly using the second sensor. In a particularly preferred embodiment, provision is made for the drive unit to be operated in an error mode until the drive period is completed, which causes the drive apparatus to be stopped and an error message to be output if the drive period is run through and no angular position change at the output shaft is detected by the first sensor at the end thereof. If, on the other hand, a change in angle is detected at the end of the drive period as expected, the control system transitions to controlling the drive apparatus with the actual values of the first sensor as long as the rotation is in the second direction.

In a further preferred embodiment, the drive period is determined on the basis of the first torque only if the first torque is outside of a limit range. It is then assumed for the detected torque that it lies on the second path and the torsion of the flexible ring can thus be determined in a sufficient manner. The limit range is determined in particular by the hysteresis curves in such a manner that it is defined between a passage through the zero line of the torsion of the first path and a passage through the zero line of the torsion of the second path.

In a further preferred embodiment, the drive period is determined on the basis of the first torque and on the basis of a hysteresis error of the flexible ring if the first torque is within the limit range. In this regard, within the limit range, the fact that the correlation between torsion and torque of the flexible ring is unknown is circumvented by the circumstance that it is known that the correlation must lie in a certain range, namely between the first path and the second path. This range, known as the hysteresis error, is defined for each torque detected within the limit range, so that a correlation between torsion and torque can be estimated using the known hysteresis error.

In a preferred embodiment, the drive period is determined as a number of drive pulses. Such drive pulses are defined in particular for a control signal, particularly preferably a digital control signal, of the drive apparatus. A linear correlation exists between a drive pulse and an angular distance over which the drive apparatus is rotated during a drive pulse. A number of drive pulses therefore corresponds to a defined angular distance over which the drive apparatus is moved. Particularly advantageously, such drive pulses can correspond directly with pulses of signals from the sensors, in particular the first sensor. In this regard, the first sensor is preferably designed as an incremental rotary encoder. The drive period as the number of drive pulses can be derived particularly easily from the detected torque and monitored by simply counting during the driving of the drive apparatus over the drive period.

A further aspect of the disclosure relates to a drive unit for a robot having a drive shaft, a drive apparatus for driving the drive shaft, and a strain wave gear for transmission from the drive shaft to the output shaft, wherein the strain wave gear has a wave generator operatively connected to the drive shaft, a flexible ring, and a toothed ring connected to the output shaft, comprising a first sensor for detecting the angular position of the output shaft and a second sensor for detecting a torque transmitted by the flexible ring, wherein the drive unit is designed to carry out a method as described above. The drive unit has the advantages described above with regard to the method and can be designed in particular without a sensor on the drive shaft, so that the drive unit is simple, inexpensive and of compact design.

In one embodiment, the first sensor and the second sensor are connected to one another in a signal-effective manner. In this way, the signals can already be combined at the sensors, wherein the collective signal is then transmitted to a control device via a single signal connection. In particular, the second sensor has corresponding data processing means, for example on a printed circuit board, for receiving a signal detected by the first sensor and a signal detected by the second sensor and sending it to a control unit, in particular after formatting it into a preferred control signal. In this way, a parallel connection of the first sensor with the control device and the second sensor with the control device can also be dispensed with, so that the drive unit is simplified. This is particularly advantageous if the control device is arranged in the drive unit away from the strain wave gear, for example at an opposite end.

In a further preferred embodiment, the first sensor is designed as an incremental rotary encoder. This enables the angular position of the output shaft to be detected reliably, wherein the sensor is of compact design. For example, the encoder can resolve with 16 bits.

In yet another preferred embodiment, the second sensor is arranged on a collar of the flexible ring. The torque transmitted via the flexible ring can be acquired in a particularly favorable manner at the collar, wherein the second sensor is arranged in particular as a printed circuit board on the collar and is therefore also of compact design.

According to yet another aspect of the disclosure, the disclosure relates to a robot having a drive unit as described above. In the robot, the method described above can be carried out with the described advantages, enabling safe and accurate positioning of a moving part of the robot, while the robot is simple, inexpensive and of compact design.

BRIEF DESCRIPTION OF THE DRAWINGS

Further measures to improve the disclosure are illustrated below together with the description of preferred exemplary embodiments of the disclosure using the figures. In the figures.

DETAILED DESCRIPTION

Figures 1, 2:
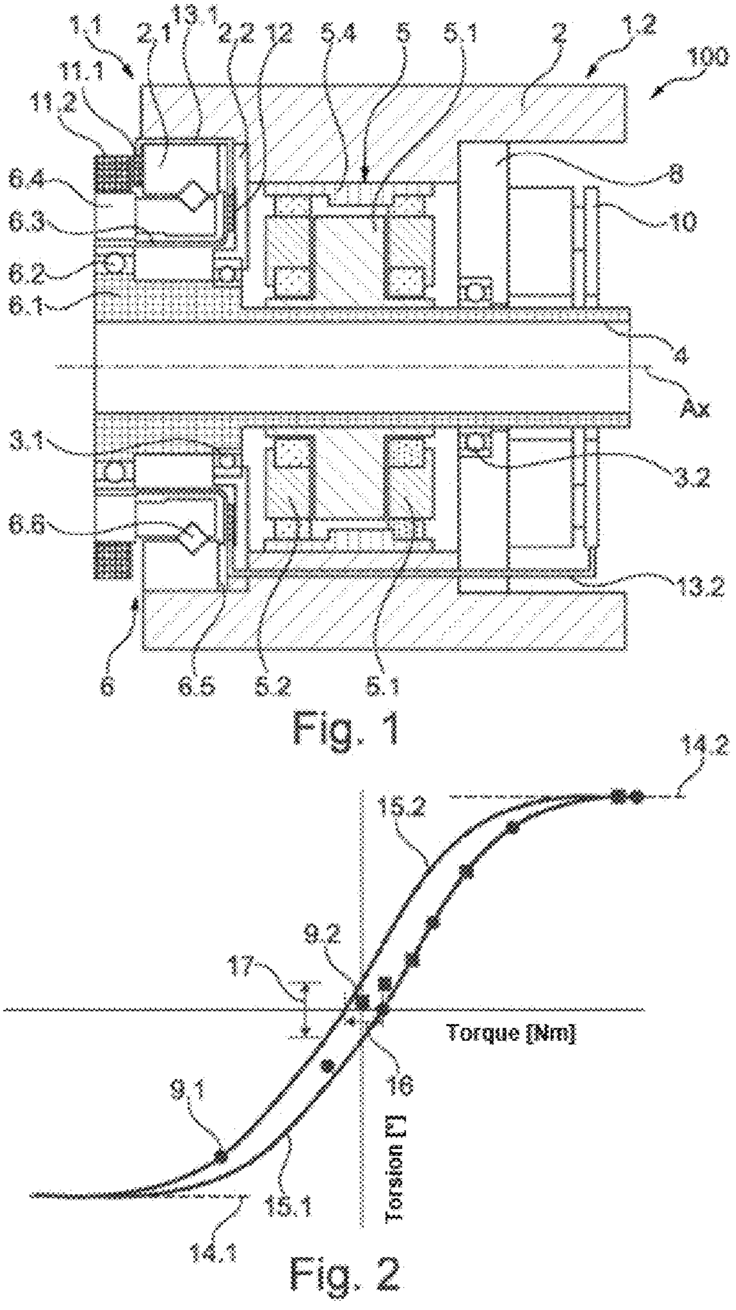
FIG. 1 shows a cross-section of a drive unit in a first embodiment.
FIG. 2 shows the correlation between the torsion of the flexible ring and the torque transmitted by the flexible ring.

FIG. 1 shows a sectional view of a drive unit 100 with a housing 2 delimiting it on the outside. All components are formed in a rotationally symmetrical manner around an axis AX. In particular, the housing 2 is designed as a cylindrical sleeve. A drive shaft 4 is mounted inside the housing 2 by means of ball bearings 3.1, 3.2, which can be driven by a drive apparatus 5 designed as an electric machine. The drive apparatus 5 is designed as an axial flux motor and is formed by a rotor 5.1, which is on the inside in the axial direction A and is pressed onto the drive shaft 4, and two stators 5.2, 5.3, which are on the outside in the axial direction A, wherein the stators 5.2, 5.3 are pressed into a motor housing 5.4, which in turn is pressed into the housing 2. The rotor 5.1 is therefore connected to the drive shaft 4 in a non-rotatable manner and the stators 5.2, 5.3 are connected to the housing 2 in a non-rotatable manner.

Furthermore, a strain wave gear 6 is arranged on a first side 1.1 of the drive unit 100, which converts a rotary motion of the drive shaft 4 into a slower rotary motion of an output shaft, not shown. The strain wave gear 6 has a wave generator 6.1, a flexible ring 6.3 (flex spline) mounted opposite the wave generator 6.1 by means of a ball bearing 6.2 and a toothed ring 6.4 (circular spline). The wave generator 6.1 is formed directly on the drive shaft 4, while the toothed ring 6.4 forms the output of the strain wave gear 6 and is connected or can be connected to the output shaft, which is not shown. The toothed ring 6.4 is movably mounted relative to a first component fixed to the housing 2.1 by means of a rolling bearing 6.6, which is only shown schematically. The flexible ring 6.3 has a collar 6.5, by means of which it is fixed between the first component fixed to the housing 2.1 and a second component fixed to the housing 2.2. The second component fixed to the housing 2.2 also holds the first ball bearing 3.1. The first and second components fixed to the housing 2.1, 2.2 are each parts of the strain wave gear 6 and are pressed into the housing 2.

On a second side 1.2 of the drive unit 100 opposite the strain wave gear 6, in an axial direction A adjacent to the drive apparatus 5, a bearing wall 8 is held in the housing 2, which holds the second ball bearing 3.2. A control unit 10 is held on the bearing wall 8 adjacent to the bearing wall 8 in the axial direction A. The control unit 10 is designed as rotationally symmetrical on the outside and is arranged coaxially with the drive shaft 4.

The strain wave gear 6 further has a first sensor 11.1, which is arranged on the first component fixed to the housing 2.1 and interacts with a sensor target 11.2 arranged on the toothed ring 6.4. The sensor 11.1 is designed as an incremental rotary encoder and detects the angular position of the toothed ring 6.4 and thus also the angular position of the output shaft. Furthermore, the strain wave gear 6 has a second sensor 12, which is arranged on the collar 6.5 of the flexible ring 6.3 and extends between the collar 6.5 and the second component fixed to the housing 2.2. The second sensor 12 detects the torque applied to the flexible ring 6.3. The first sensor 11.1 is connected to the second sensor 12 by means of a first signal line 13.1, wherein the second sensor 12 is in turn connected to a control unit 10 via a second signal line 13.2 extending through the housing 2, so that signals comprising the information detected by the sensors 11.1, 12 are transmitted to the control unit 10 via the first signal line 13.1 and the second signal line 13.2.

FIG. 2 shows a correlation between the torsion of the flexible ring 6.3 and the torque transmitted by the flexible ring 6.3. Here, a torque applied in the negative range of the X-axis corresponds to a rotation of the drive unit 100 in a first direction and a torque applied in the positive range of the X-axis corresponds to a rotation of the drive unit 100 in a second direction. In this context, a maximum torsion occurs in both directions from a certain torque, which is referred to as the first transmission torsion 14.1 or second transmission torsion 14.2. When there is a change in direction between the first and second direction as shown in FIG. 2, the correlation follows a hysteresis curve. Starting from a rotation in the first direction, the correlation therefore follows a first path 15.1 and starting from a rotation in the second direction, a second path 15.2.

If at the time of a change in direction, for example from the first direction to the second direction, the first transmission torsion 14.1 is completely formed, for example if driving in the first direction has taken place immediately up to the change in direction, the correlation follows the first path and is defined at all times. The correlation is defined at the beginning and at the end of the change in direction, when the first transmission torsion 14.1 is not fully formed, but nevertheless driving in the first direction has taken place immediately up to the change in direction. The course of the correlation during such a change in direction is shown with several circles starting from a first starting point 9.1. In this regard, the correlation passes through an undefined range in order to get from the second path 15.2 to the first path 15.1. The correlation is not defined at the beginning of a change in direction if no torque is applied, for example if no rotation has taken place before the change in direction. The correlation then lies within a limit range 16. However, it is known within this limit range 16 that the actual torsion lies only between the first path 15.1 and the second path 15.2, wherein the distance between these two paths 15.1, 15.2 for a given torque is defined as the hysteresis error 17 and is used to define the drive period when detecting the torque. The course of the correlation during such a change in direction is shown with several squares starting from a second starting point 9.2. In particular, one portion of the drive period is calculated in order to overcome the maximum hysteresis error and one portion in order to get from the hysteresis error to the transmission torsion 14.2, wherein the two portions are then added together to form the actual drive period.

Figure 3:
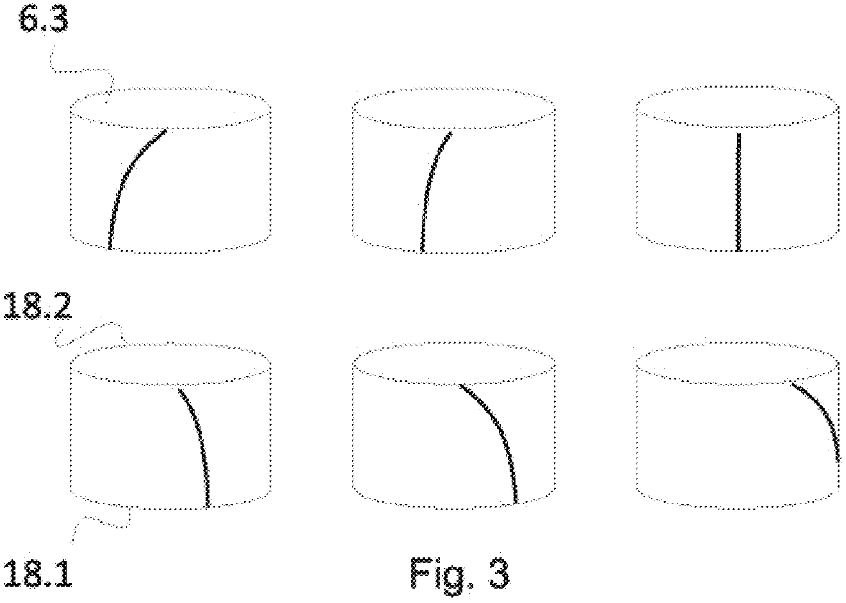
FIG. 3 shows a highly simplified representation of the flexible ring in multiple torsional states.

FIG. 3 shows several representations of the torsion on a flexible ring 6.3, illustrated in a highly schematic manner, during a change in direction. In the first representation, the first transmission torsion 14.1 is formed. With a change in direction starting from this situation, the torsion is first reduced via the second representation up to the third representation and then built up to the second transmission torsion 14.2, as shown in the fourth and fifth representations. Here, only an input side 18.1, but not an output side 18.2 of the flexible ring 6.3 is rotated. Only when the second transmission torsion 14.2 is attained in the fifth representation do the input side 18.1 and the output side 18.2 rotate synchronously again, as shown in the sixth representation.

Figure 4:
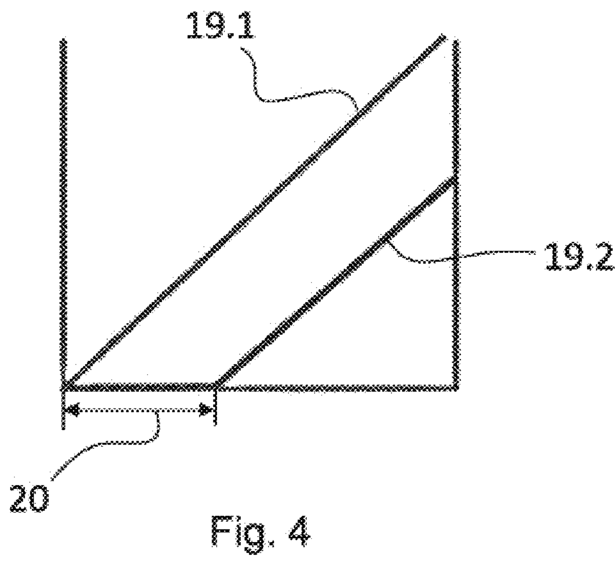
FIG. 4 shows a correlation between a rotation of the drive apparatus and a rotation of the output shaft.

FIG. 4 shows the course of the angular position of the drive shaft 4 in a first graph 19.1 and the course of the angular position of the output shaft in a second graph 19.2, in each case over time during a change in direction, as shown in FIG. 3. Here, the change in the angular position of the drive shaft 4 corresponds to the rotation of the input side 18.1 of the flexible ring 6.3 and the angular position of the output shaft corresponds to the rotation of the output side 18.2 of the flexible ring 6.3. In this regard, the second graph 19.2 lags behind the first graph 19.1 by one phase 20.

Figure 5:
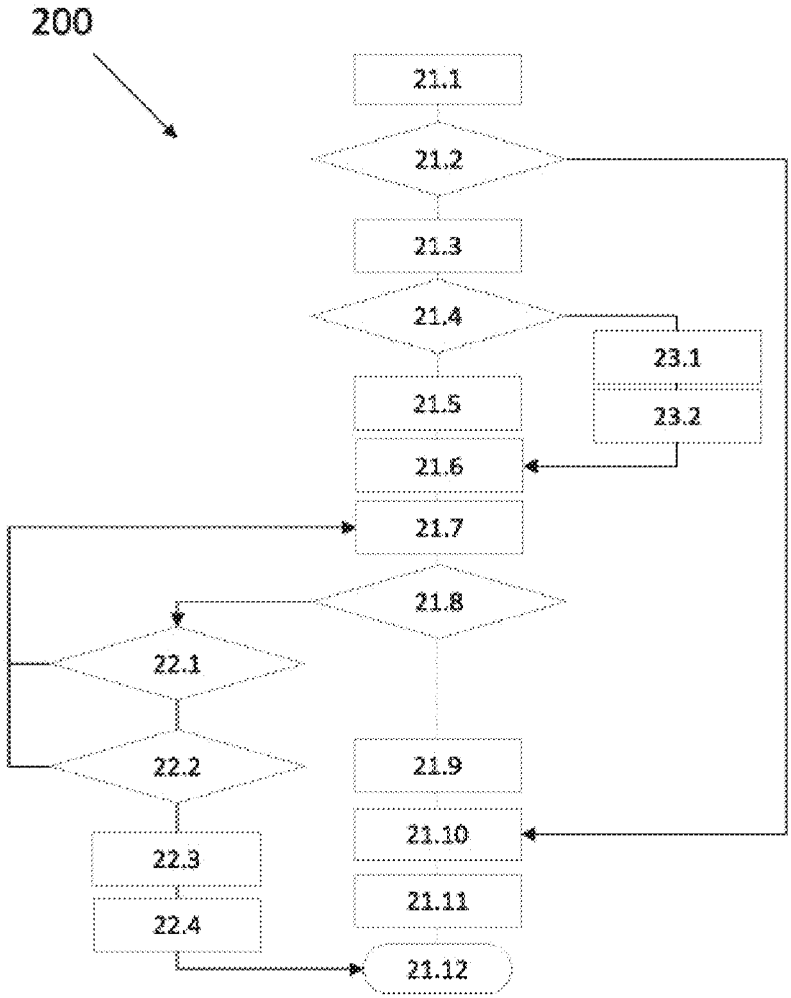
FIG. 5 shows a diagram showing the sequence of a method according to one aspect of the disclosure.

FIG. 5 shows a sequence of a method 200 according to one aspect of the disclosure. In a first method step 21.1, the drive apparatus 5 receives a control signal for driving the drive shaft 4. Following this, it is checked in a second method step 21.2 whether the direction of this driving differs from a prior driving or a prior rotation. If this is the case, there is a change in direction. In a third method step 21.3, the torque transmitted by the flexible ring 6.3 is then detected by means of the second sensor 12. In a fourth method step 21.4, it is then checked whether the detected torque is within or outside of the limit range 16. If it is within the limit range 16, in a fifth method step 21.5 a number of drive pulses for the drive apparatus 5 is calculated as the drive period, which results from the number of drive pulses for overcoming the hysteresis error 17 and the number of drive pulses for attaining the transmission torsion 14.1, 14.2 after overcoming the hysteresis error 17. Thereafter, in a sixth method step 21.6, the driving of the drive apparatus 5 over the drive period is started. In a seventh method step 21.7, a drive period signal is generated, which indicates that the drive period has not yet been completed. The drive period signal is deactivated after the drive period has elapsed. In an eighth step 21.8, a change in the angular position of the output shaft is detected by means of the first sensor 11.1. If such a change in angle is present, the drive period signal is terminated in a ninth step 21.9, whereupon in a tenth step 21.10 the control of the drive apparatus 5 is started on the basis of the first sensor 11.1, in particular using a control method, and in an eleventh method step 21.11 the output shaft is moved to a target position on the basis of this control. In a twelfth method step 21.12, the method 200 is terminated.

If it is recognized in the eighth method step 21.8 that no change in angular position has been detected, a thirteenth method step 22.1 checks whether the drive period signal is still present. If this is the case, the method 200 is continued from the seventh method step 21.7. If this is not the case, the torque applied to the flexible ring 6.3 is detected again in a fourteenth method step 22.2. If a significant change is detected here compared to the torque detected immediately during the change in direction, the method 200 is continued from the seventh method step 21.7. If no change is detected in the torque, an error signal is generated in a fifteenth method step 22.3, by means of which the drive apparatus 5 is stopped in a sixteenth method step 22.4 and the method 200 is then terminated.

If it is detected in the fourth method step 21.4 that the detected torque is outside of the limit range 16, a torsion present on the flexible ring 6.3 is determined from the detected torque in a seventeenth method step 23.1 on the basis of the correlation shown in FIG. 2 and a drive period is calculated from this torsion in an eighteenth method step 23.2, whereupon the method 200 is continued from the sixth method step 21.6. Furthermore, if a constant drive direction is detected in the second method step 21.2 compared to a prior rotation, the method 200 is continued from the tenth method step 21.10.

LIST OF REFERENCE SIGNS

1.1 First side
1.2 Second side

2 Housing
2.1 First component fixed to the housing
2.2 Second component fixed to the housing
3.1 First ball bearing
3.2 Second ball bearing
4 Drive shaft
5 Drive apparatus
5.1 Rotor
5.2 First stator
5.3 Second stator
5.4 Motor housing
6 Strain wave gear
6.1 Wave generator
6.2 Ball bearing
6.3 Flexible ring
6.4 Toothed ring
6.5 Collar
6.6 Rolling bearing
8 Bearing wall
9.1 First starting point
9.2 Second starting point
10 Control unit
11.1 First sensor
11.2 Sensor target
12 Second sensor
13.1 First signal line
13.2 Second signal line
14.1 First transmission torsion
14.2 Second transmission torsion
15.1 First path
15.2 Second path
16 Limit range
17 Hysteresis error
18.1 Input side of the flexible ring
18.2 Output side of the flexible ring
19.1 First graph
19.2 Second graph
20 Phase
21.1 First method step
21.2 Second method step
21.3 Third method step
21.4 Fourth method step
21.5 Fifth method step
21.6 Sixth method step
21.7 Seventh method step
21.8 Eighth method step
21.9 Ninth method step
21.10 Tenth method step
21.11 Eleventh method step
21.12 Twelfth method step
22.1 Thirteenth method step
22.2 Fourteenth method step
22.3 Fifteenth method step
22.4 Sixteenth method step
23.1 Seventeenth method step
23.2 Eighteenth method step
100 Drive unit
200 Method
AX Axis

The invention claimed is:

1. A method for controlling an angular position of an output shaft in a drive unit having a drive shaft, a drive apparatus for driving the drive shaft, and a strain wave gear for transmission from the drive shaft to the output shaft, wherein the strain wave gear has a wave generator operatively connected to the drive shaft, a flexible ring, and a toothed ring connected to the output shaft, comprising a first sensor for detecting the angular position of the output shaft and a second sensor for detecting a first torque transmitted by the flexible ring, the method comprising the steps of:

detecting a change in a direction of the drive apparatus with respect to a prior rotation, detecting the first torque transmitted by the flexible ring immediately upon detection of the change in the direction by means of the second sensor, determining a drive period of the drive apparatus until an expected attainment of a transmission torsion of the flexible ring on a basis of the first torque, driving the drive shaft by means of the drive apparatus over the drive period, detecting a change in the angular position of the output shaft immediately after an end of the drive period by means of the first sensor, and controlling the drive apparatus using the first sensor following the drive period when the change in the angular position is detected.

2. The method according to claim 1, wherein the drive apparatus is stopped if there is no change in angular position after the end of the drive period.

3. The method according to claim 1, wherein the drive period is determined on the basis of the first torque only if the first torque is outside of a limit range.

4. The method according to claim 1, wherein the drive period is determined on the basis of the first torque and on the basis of a hysteresis error of the flexible ring if the first torque is within the limit range.

5. The method according to claim 1, wherein the drive period is determined as a number of drive pulses.

6. A drive unit for a robot having a drive shaft, a drive apparatus for driving the drive shaft, and a strain wave gear for transmission from the drive shaft to the output shaft, wherein the strain wave gear has a wave generator operatively connected to the drive shaft, a flexible ring, and a toothed ring connected to the output shaft, comprising a first sensor for detecting the angular position of the output shaft and a second sensor for detecting a torque transmitted by the flexible ring, wherein the drive unit is designed to carry out a method according to claim 1.

7. The drive unit according to claim 6, wherein the first sensor and the second sensor are connected to one another in a signal-effective manner.

8. The drive unit according to claim 6, wherein the first sensor is designed as an incremental rotary encoder.

9. The drive unit according to claim 6, wherein the second sensor is arranged on a collar of the flexible ring.

10. A robot having a drive unit according to claim 6.

11. A method for controlling an angular position of an output shaft in a drive unit comprising:

detecting, with a first sensor, a change in direction of a drive apparatus of the drive unit with respect to a prior rotation;

detecting a first torque transmitted by a flexible ring of a strain wave gear of the drive unit upon detection, with a second sensor, of the change in direction;

determining a drive period of the drive apparatus until an expected attainment of a transmission torsion of the flexible ring based on the first torque;

driving a drive shaft by the drive apparatus over a drive period;

detecting, with the first sensor, a change in angular position of the output shaft after an end of the drive period; and controlling the drive apparatus, with the first sensor, following the drive period when a change in angular position is detected.

12. The method according to claim 11, wherein the drive apparatus is stopped when there is no change in angular position after the end of the drive period.

13. The method according to claim 11, wherein the drive period is determined based on the first torque when the first torque is outside of a limit range.

14. The method according to claim 11, wherein the drive period is determined based on the first torque and a hysteresis error of the flexible ring when the first torque is within the limit range.

15. The method according to claim 11, wherein the drive period is determined as a number of drive pulses.

16. A robot comprising:

a drive unit comprising a drive shaft;

a drive apparatus for driving the drive shaft; and a strain wave gear for transmission from the drive shaft to an output shaft, wherein the strain wave gear comprises:

a wave generator connected to the drive shaft; a flexible ring;

a toothed ring connected to the output shaft;

a first sensor for detecting the angular position of the output shaft; and a second sensor for detecting a torque transmitted by the flexible ring.

17. The robot according to claim 16, wherein the first sensor is connected to the second sensor.

18. The robot according to claim 16, wherein the first sensor is configured as an incremental rotary encoder.

19. The robot according to claim 16, wherein the second sensor is located on a collar of the flexible ring.

20. The robot according to claim 16, wherein the drive unit is configured to move one or more components of the robot.

* * * * *